(12) United States Patent
Okamoto et al.

(10) Patent No.: US 12,062,947 B2
(45) Date of Patent: Aug. 13, 2024

(54) ROTOR FOR ROTARY ELECTRIC MACHINE AND ROTARY ELECTRIC MACHINE

(71) Applicant: Hitachi Astemo, Ltd., Hitachinaka (JP)

(72) Inventors: Hiromitsu Okamoto, Ibaraki (JP); Kenichi Nakayama, Ibaraki (JP); Satoshi Yamamura, Ibaraki (JP); Tomohiro Adachi, Ibaraki (JP); Shinji Yamazaki, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 379 days.

(21) Appl. No.: 17/605,330

(22) PCT Filed: Apr. 10, 2020

(86) PCT No.: PCT/JP2020/016070
§ 371 (c)(1),
(2) Date: Oct. 21, 2021

(87) PCT Pub. No.: WO2020/218030
PCT Pub. Date: Oct. 29, 2020

(65) Prior Publication Data
US 2022/0216753 A1 Jul. 7, 2022

(30) Foreign Application Priority Data
Apr. 25, 2019 (JP) ................................. 2019-083934

(51) Int. Cl.
*H02K 1/276* (2022.01)
*H02K 1/28* (2006.01)
(Continued)

(52) U.S. Cl.
CPC ............... *H02K 1/28* (2013.01); *H02K 1/276* (2013.01); *B60K 6/26* (2013.01); *B60Y 2200/92* (2013.01); *B60Y 2400/60* (2013.01); *H02K 29/03* (2013.01)

(58) Field of Classification Search
CPC .... H02K 2213/03; H02K 29/03; H02K 21/14; H02K 7/04; H02K 7/006; H02K 1/276;
(Continued)

(56) References Cited

U.S. PATENT DOCUMENTS 5,801,470 A 9/1998 Johnson et al.
2016/0359384 A1* 12/2016 Okamoto ............... H02K 1/276

FOREIGN PATENT DOCUMENTS

CN 102790454 A 11/2012
CN 104321953 A 1/2015
(Continued)

OTHER PUBLICATIONS

International Search Report with English translation and Written Opinion issued in corresponding application No. PCT/JP2020/016070 dated Aug. 4, 2020.

(Continued)

*Primary Examiner* — Bryan R Perez
(74) *Attorney, Agent, or Firm* — Foley & Lardner LLP (57) ABSTRACT

An object of the present invention is to firmly fix a magnet at a predetermined position of a magnet insertion portion. A rotor for a rotary electric machine includes: a rotary shaft; at least one magnet; a rotor core having at least one magnet housing inside which the at least one magnet is attached; and at least one fixing member disposed inside the at least one magnet housing to fix the at least one magnet, wherein the at least one fixing member includes: a first fixing portion that is in contact with a side surface of the at least one magnet in a radial direction of the rotary shaft or in contact with a (Continued)

side surface of the at least one magnet in a circumferential direction of the rotary shaft; and a second fixing portion that is in contact with an end face of the at least one magnet in an axial direction of the rotary shaft. The first fixing portion and the second fixing portion are connected to each other at an angle smaller than 90 degrees, and the at least one fixing member is inserted, together with the at least one magnet, in the at least one magnet housing and presses the at least one magnet against an inner wall of the at least one magnet housing due to an increase in the angle between the first fixing portion and the second fixing portion.

18 Claims, 9 Drawing Sheets

(51) Int. Cl.
*B60K 6/26* (2007.10)
*H02K 29/03* (2006.01)

(58) Field of Classification Search
CPC .......... H02K 1/28; H02K 1/27; H02K 1/2766; H02K 1/2773; H02K 1/22
See application file for complete search history.

(56) References Cited

FOREIGN PATENT DOCUMENTS

| | | |
|---|---|---|
| EP | 2 856 612 B1 | 8/2019 |
| JP | H05-219668 A | 8/1993 |
| JP | 2003-092846 A | 3/2003 |
| JP | 2014-107924 A | 6/2014 |
| JP | 2017-184375 A | 10/2017 |

OTHER PUBLICATIONS

Chinese Office Action issued in corresponding CN Application No. 202080029491.6, dated Apr. 24, 2024 with Machine translation (14 pages).

* cited by examiner

ROTOR FOR ROTARY ELECTRIC MACHINE AND ROTARY ELECTRIC MACHINE

TECHNICAL FIELD

The present invention relates to a rotor for a rotary electric machine.

BACKGROUND ART

As a background art in the present technical field, the following conventional art is disclosed. PTL 1 (JP 2017-184375 A) describes a rotor for a rotary electric machine including: a rotor core; and a magnet housing hole which penetrates along an axial direction Z of the rotor core and in which a permanent magnet is housed, wherein a pair of non-magnetic plates are fixed each on one of both end faces of the rotor core, a pair of magnet fixing pieces sandwiching narrow-width side surfaces of the permanent magnet are extended to enter the magnet housing hole from a part of the plate corresponding to the magnet housing hole.

CITATION LIST

Patent Literature

PTL 1: JP 2017-184375 A

SUMMARY OF INVENTION

Technical Problem

A magnet insertion hole provided in a rotor core of a rotary electric machine is formed larger than a permanent magnet inserted therein, and the magnet moves in the magnet insertion hole due to rotational motion or vibration of the rotor; therefore, there is a problem that the magnet is brought into contact with the magnet insertion wall by the movement and becomes worn. In order to suppress such movement of the magnet, the permanent magnet is fixed to the magnet insertion hole with an adhesive. In addition, in PTL 1, a pair of magnet fixing pieces sandwiching the narrow-width side surfaces of the permanent magnet are provided.

However, when an adhesive is used to fix the permanent magnet, a configuration for applying the adhesive is required, and the number of steps increases. In addition, a step of removing an excessive adhesive protruding from the rotor is required. In addition, the attachment position of the magnet in the magnet insertion hole varies, and a performance of the rotary electric machine is deteriorated. Further, it is difficult to remove the magnet after assembly, so that it is difficult to recycle the rotary electric machine at the time of disposal. In the rotor for the rotary electric machine described in PTL 1, parts of the plate are formed into the magnet fixing pieces, and ease of assembly is accordingly low. Further, a stator core cannot be configured with a plurality of divided core pieces.

Solution to Problem

An example of a typical example of the invention disclosed in the present application is as follows. Specifically, a rotor for a rotary electric machine has the following features. The rotary shaft includes: a rotary shaft; at least one magnet; a rotor core having at least one magnet housing inside which the at least one magnet is attached; and at least one fixing member disposed inside the at least one magnet housing to fix the at least one magnet, wherein the at least one fixing member includes: a first fixing portion that is in contact with a side surface of the at least one magnet in a radial direction of the rotary shaft or in contact with a side surface of the at least one magnet in a circumferential direction of the rotary shaft; and a second fixing portion that is in contact with an end face of the at least one magnet in an axial direction of the rotary shaft. The first fixing portion and the second fixing portion are connected to each other at an angle smaller than 90 degrees, and the at least one fixing member is inserted, together with the at least one magnet, in the at least one magnet housing and presses the at least one magnet against an inner wall of the at least one magnet housing due to an increase in the angle between the first fixing portion and the second fixing portion.

Advantageous Effects of Invention

An aspect of the present invention makes it possible to firmly fix the magnet at a predetermined position of the magnet insertion portion. The following description of embodiments will clarify problems, configurations, and effects other than those described above.

DESCRIPTION OF EMBODIMENTS

Hereinafter, embodiments will be described with reference to the drawings.

Figure 1:
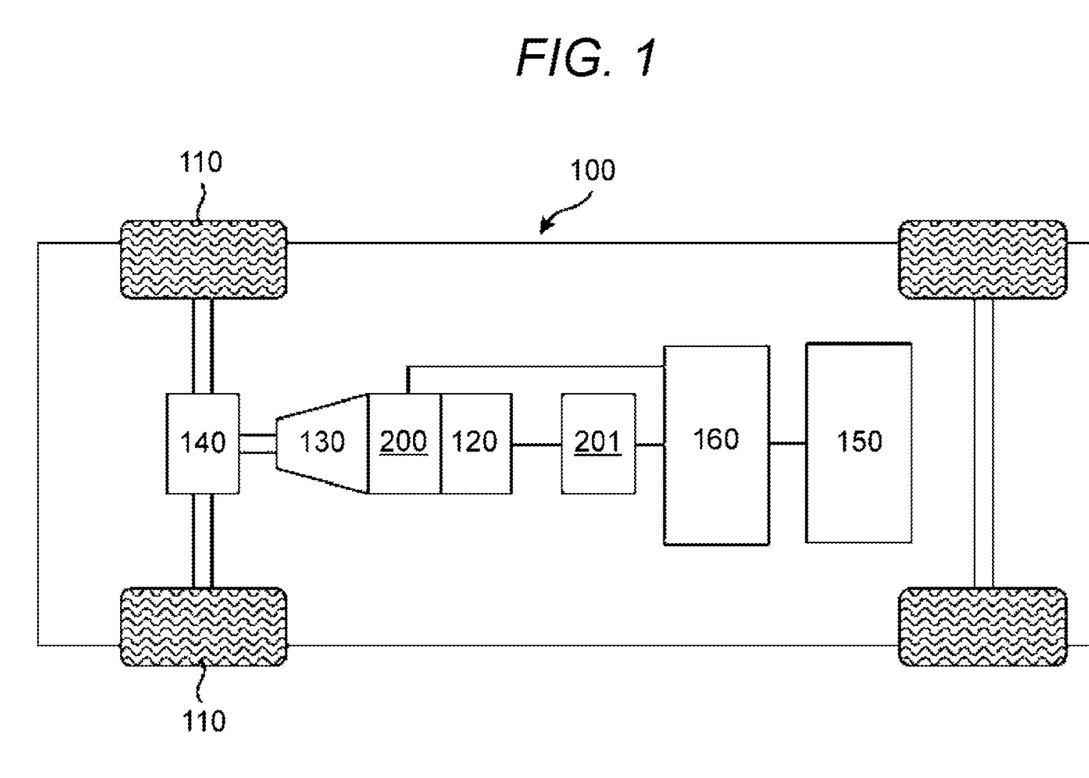
FIG. 1 is a schematic configuration view of a hybrid electric vehicle equipped with a rotary electric machine according to an embodiment of the present invention.

As illustrated in FIG. 1, a vehicle 100 of a hybrid vehicle is mounted with an engine 120, a first rotary electric machine 200, a second rotary electric machine 201, and a high-voltage battery 150. The battery 150 is configured with a secondary battery such as a lithium-ion battery or a nickel-metal-hydride battery, and outputs high voltage DC power of 250 volts to 600 volts or higher. The battery 150 supplies DC power to the rotary electric machines 200 and 201 when driving force by the rotary electric machines 200 and 201 is required, and the battery 150 is supplied with DC power from the rotary electrical machines 200 and 201 during regenerative running. The DC power is supplied and received between the battery 150 and the rotary electric machines 200 and 201 via a power convertor 160.

Although not illustrated, the vehicle 100 is equipped with a battery that supplies low-voltage power (for example, 14-volt system power). Rotational torque generated by the engine 120 and the rotary electric machines 200 and 201 is transmitted to front wheels 110 via a transmission 130 and a differential gear 140. The rotary electric machines 200 and 201 have substantially the same configuration, and the rotary electric machine 200 will be representatively described below.

Figure 2:
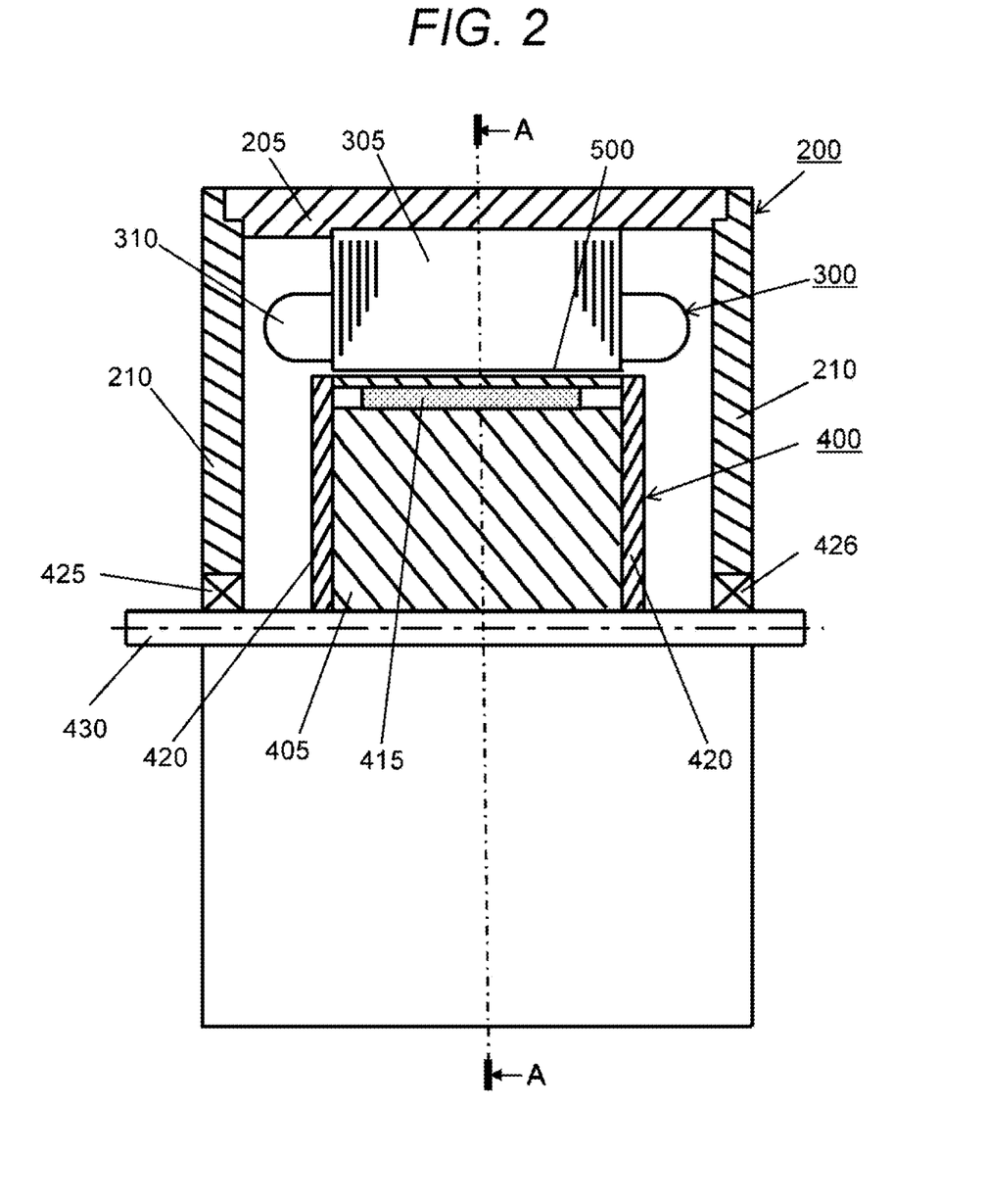
FIG. 2 is a schematic diagram illustrating an overall configuration of a rotary electric machine.

FIG. 2 is a schematic diagram illustrating an overall configuration of the rotary electric machine 200. FIG. 2 is a partial cross-sectional view of the rotary electric machine 200, and illustrates the inside of the rotary electric machine 200.

As illustrated in FIG. 2, a stator 300 is supported inside a housing 205, and the stator 300 includes a stator core 305 and a stator coil 510. A rotor 400 is rotatably supported in the inner peripheral side of the stator core 305 via an air gap 500. The rotor 400 has a rotor core 405 fixed to a shaft 430, a permanent magnet 415, and end plates 420 of a non-magnetic material. The housing 205 has a pair of end brackets 210 on which bearings 425 and 426 are provided, and the shaft 430 is rotatably supported by the bearings 425 and 426. The end plates 420 are fixed to the shaft 430 by press fitting, shrink fitting, or the like.

The rotary electric machine 200 is a three-phase synchronous motor with built-in permanent magnets. The rotary electric machine 200 operates as an electric motor in which the rotor 400 is rotated by a current of a three-phase alternating current supplied to the stator coil 510 wound around the stator core 305. In addition, when driven by the engine 120, the rotary electric machine 200 operates as a generator and outputs generated three-phase alternating current power. That is, the rotary electric machine 200 has both of the following two functions: a function as an electric motor that generates rotational torque using electric energy; and a function as a generator that generates electric power using mechanical energy, and the above-described functions can be selectively used depending on a running condition of the vehicle.

Figure 3:
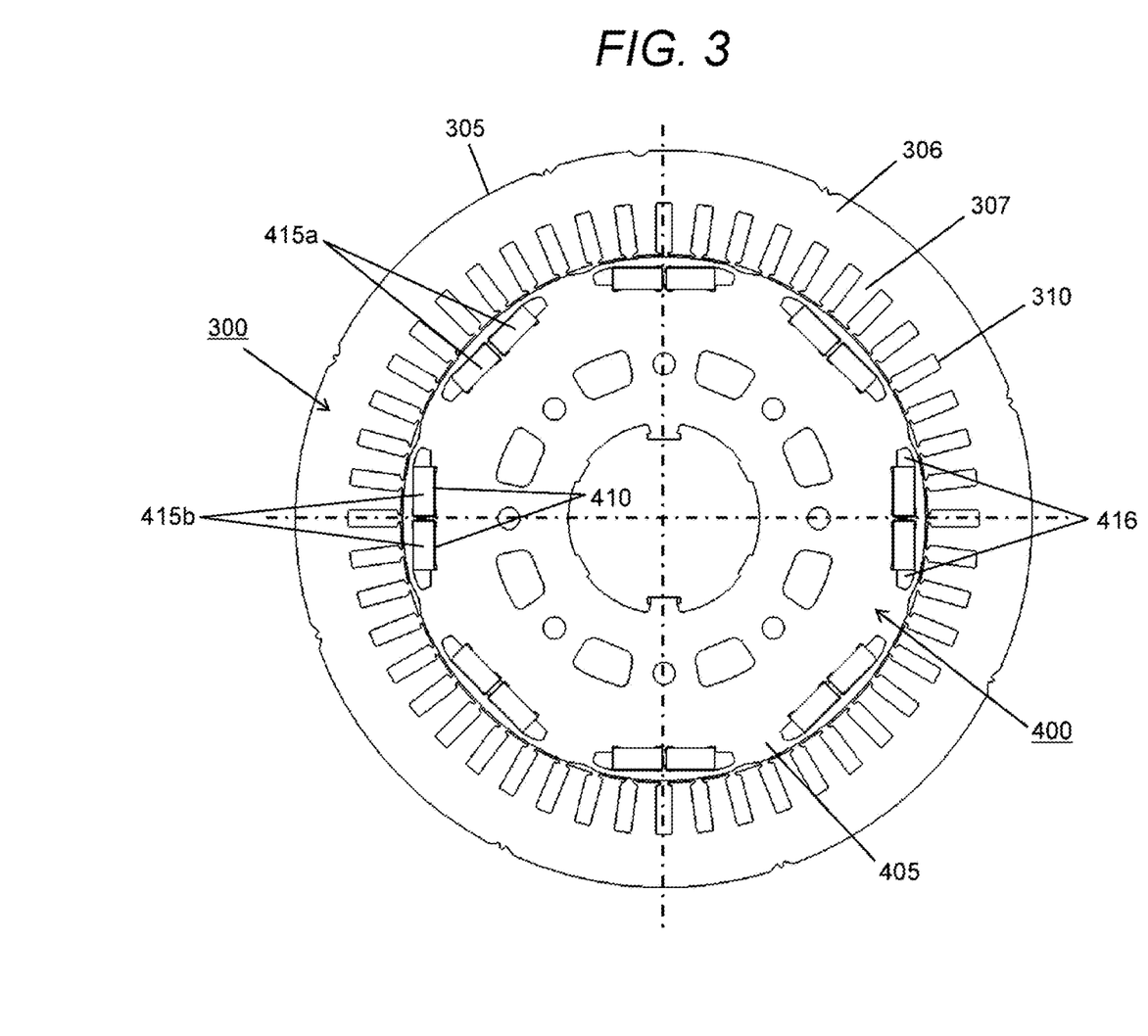
FIG. 3 is a cross-sectional view taken along line A-A of FIG. 2.
Figure 4:
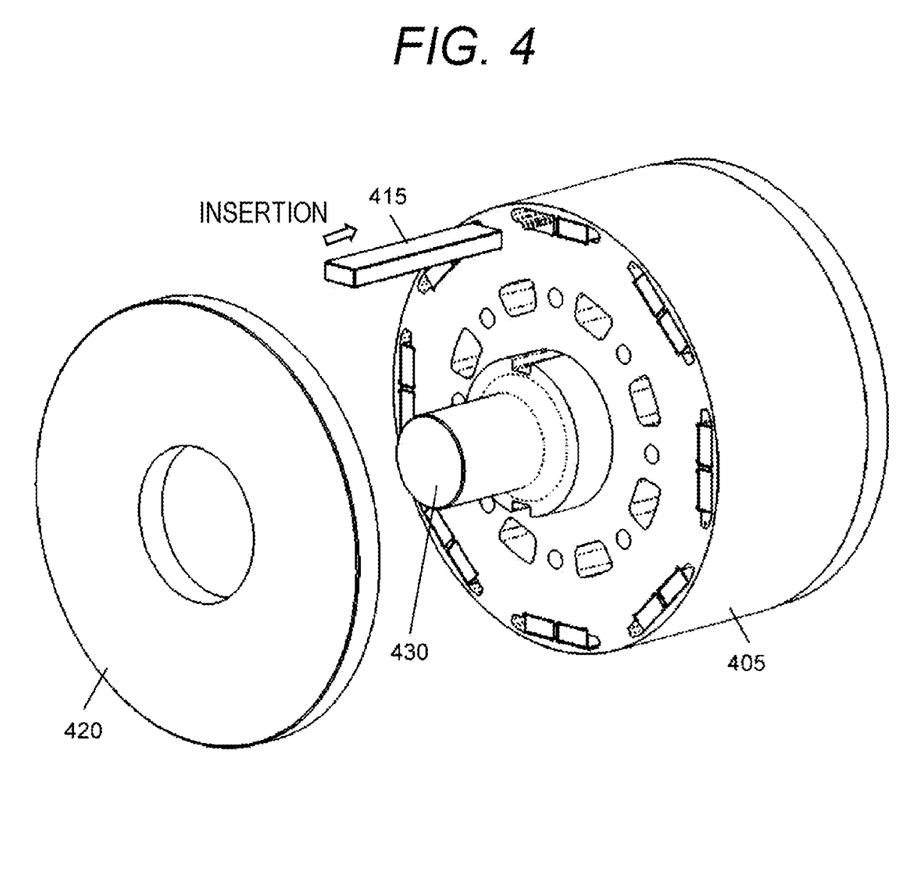
FIG. 4 is an exploded perspective view of a rotor.

FIG. 3 is a diagram illustrating an A-A cross-section (see FIG. 2) of the stator 300 and the rotor 400 shown in FIG. 2, and FIG. 4 is an exploded perspective view of the rotor 400 of the present embodiment. In FIG. 3, the housing 205 and the shaft 430 are not shown.

The stator core 305 is formed in such a manner that by laminating a plurality of magnetic bodies (for example, a plurality of electromagnetic steel sheets) are stacked in the axial direction, and is configured with a yoke portion and a teeth portion (also referred to as projections and salient pole portions). The yoke portion is configured with a cylindrical yoke core 306 (also referred to as a core back) fitted to the inner peripheral side of the housing 205. The teeth portion protrudes in the radial direction from the inner peripheral side of the yoke core 306, and is configured with a plurality of teeth cores 307 arranged in the circumferential direction at predetermined intervals. In FIG. 3, not all the teeth are denoted by reference signs, but only some of the teeth cores 307 are representatively denoted by reference numerals. A plurality of slots 310 are formed, continuously in the circumferential direction, on the rotor 400 side between respective ones of the neighboring teeth cores 307. In the slots 310, slot insulations (not shown) using a slot liner are provided, and winding wires of a plurality of phases such as a U-phase, a V-phase, and a W-phase constituting the stator 300 are mounted. In the present embodiment, the stator coil is wound by distributed winding.

On the other hand, the rotor core 405 is formed of a plurality of magnetic bodies, for example, a plurality of electromagnetic steel sheets stacked in the axial direction, and the electromagnetic steel plates have magnet insertion holes 410 into which magnets are inserted. The magnet insertion holes 410 are formed at equal intervals in the circumferential direction in the vicinity of an outer peripheral part of the rotor core 405, and a magnet is embedded in each magnet insertion hole. Magnet insertion holes 410 are formed such that a width and thickness of each magnet insertion hole 410 are larger than the width and thickness of the permanent magnet 415. Therefore, an air gap is formed between a surface of each permanent magnet 415 and an inner wall of the corresponding magnet insertion hole 410 to improve ease of insertion of the permanent magnets 415 at the time of assembly. The permanent magnets 415 acts as field poles of the rotor 400.

The magnet insertion holes 410 are larger than the length dimensions (dimension in a stacking direction) of the permanent magnets 415 in consideration of accumulated dimensional tolerance of components in the stacking direction of the rotor core 405, and gaps are formed between permanent magnets 415 and each end plate 420.

As described above, since an air gap is provided between each permanent magnet 415 and the corresponding magnet insertion hole 410 in each of the radial direction, the circumferential direction, and the axial direction, the permanent magnet 415 may come into contact with the inner wall of the magnet insertion hole 410 and could become worn due to movement of the permanent magnet 415 in the magnet insertion hole 410 due to rotation or vibration of the rotor 400. The wear of the permanent magnet 415 causes deterioration of characteristics of the rotary electric machine 200. Therefore, in the present embodiment, a fixing member 440 made of a thin plate is disposed in the gap between each permanent magnet 415 and the rotor core 405 to fill the gap and thus to hold each permanent magnet 415, thereby suppressing the movement of each permanent magnet 415.

The magnetization direction of each permanent magnet 415 is directed in the radial direction, and the direction of the magnetization direction is reversed for each field pole. Specifically, when stator side surfaces of the permanent magnets 415a are the N-pole and surfaces on a shaft side are the S-pole, the stator side surfaces of the adjacent permanent magnets 415b are the S-pole and the surfaces on the shaft side are the N-pole. These permanent magnets 415a and 415b are alternately arranged in the circumferential direction. The permanent magnets 415 may be embedded in the rotor core 405 after being magnetized, or may be inserted into the rotor core 405 before being magnetized and then be magnetized by applying a strong magnetic field. The permanent magnets 415 after magnetization are strong magnets, and when the magnets are magnetized before the permanent magnets 415 are fixed to the rotor 400, strong attractive force is generated between the permanent magnets 415 and the rotor core 405 at the time of fixing the permanent magnets 415, and this attractive force hiders the work. In addition, the strong attractive force might cause dust such as iron powder to adhere to the permanent magnets 415. Therefore, when the permanent magnets 415 are magnetized after being inserted into the rotor core 405, productivity of the rotary electric machine is improved.

As the permanent magnets 415, there can be used neodymium-based magnets, samarium-based sintered magnets, ferrite magnets, neodymium-based bonded magnets, or the like. The permanent magnets 415 each have a residual magnetic flux density of approximately 0.4 to 1.3 T.

Figure 5:
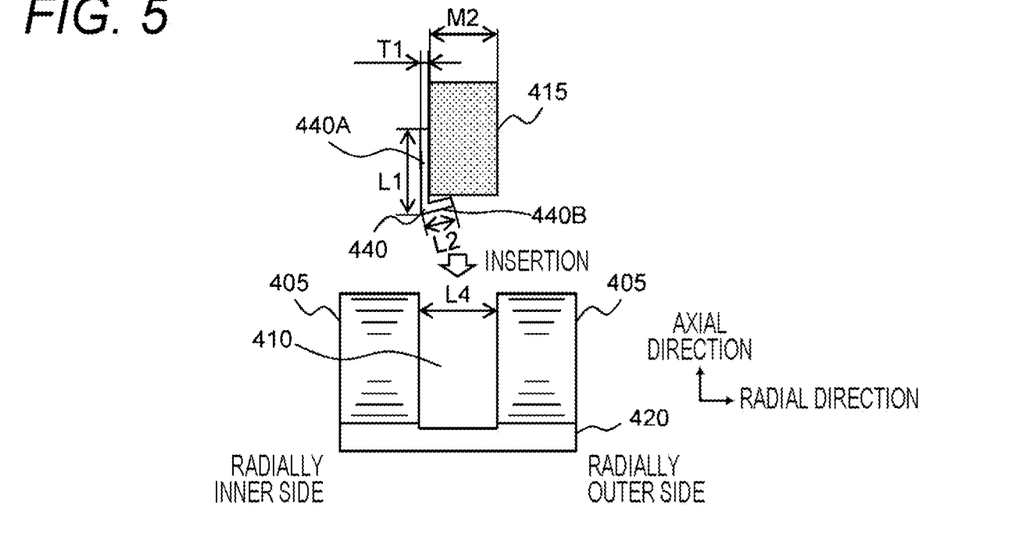
FIG. 5 is a partial cross-sectional view of a stator core before a permanent magnet is inserted into a magnet insertion hole.
Figure 6:
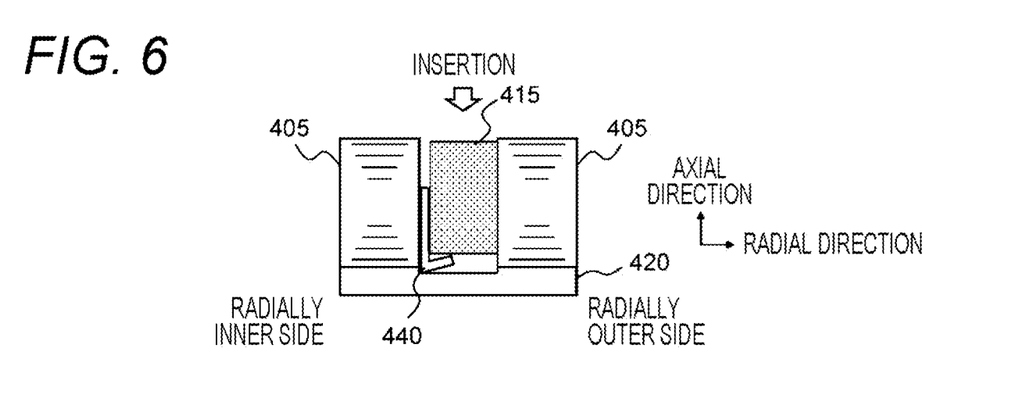
FIG. 6 is a partial cross-sectional view of the stator core in a state where the permanent magnet is inserted in the magnet insertion hole.
Figure 7:
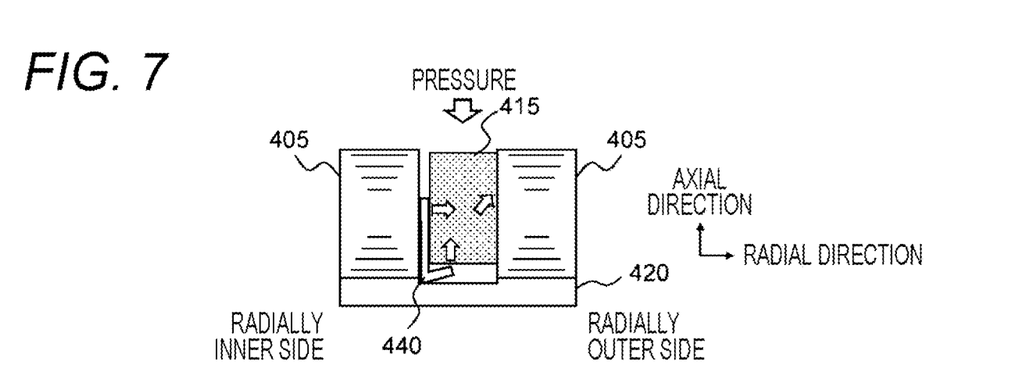
FIG. 7 is a partial cross-sectional view of the stator core in a state where the permanent magnet is inserted in the magnet insertion hole.
Figure 8:
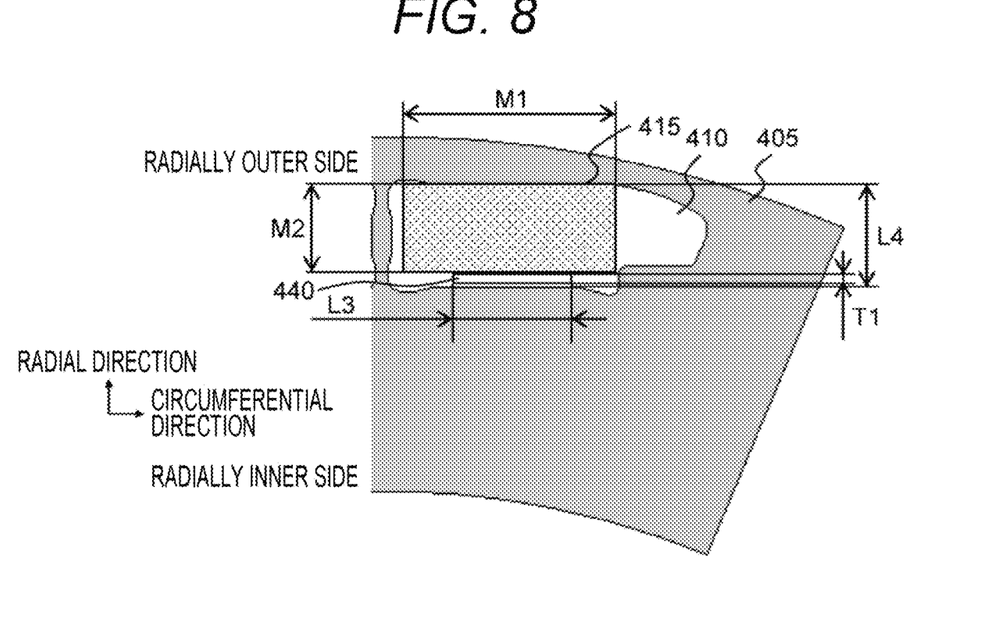
FIG. 8 is a view of a state in which a fixing member is attached to a side surface of a permanent magnet in a radial direction (side surface extending in a circumferential direction) as viewed from an axial direction.
Figure 9:
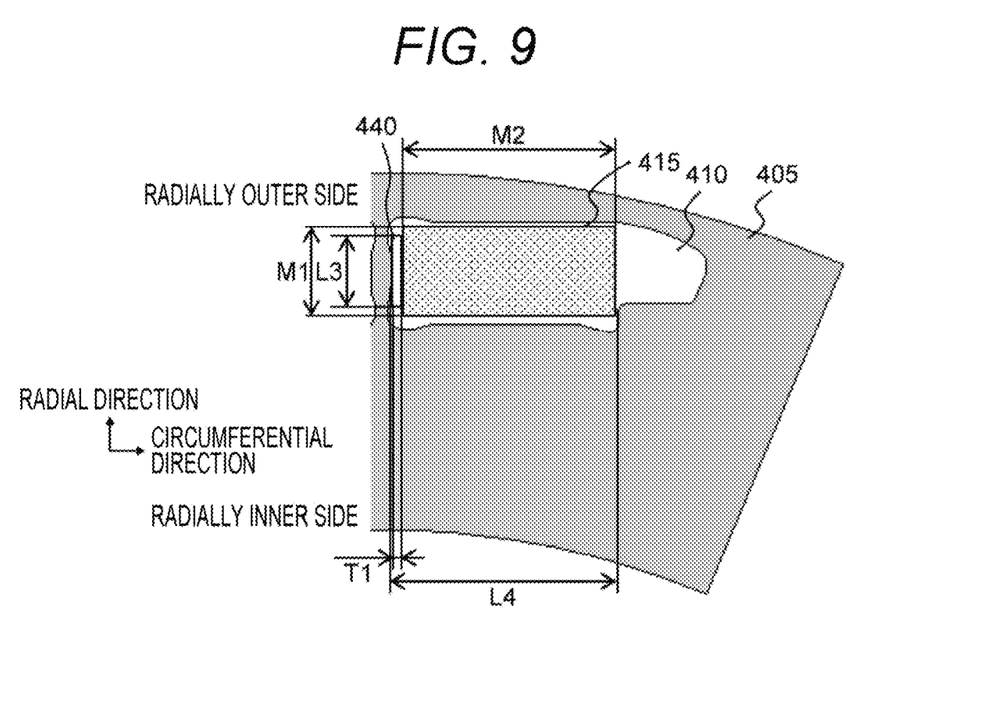
FIG. 9 is a view of a state in which a fixing member is attached to a side surface of a permanent magnet in the circumferential direction (side surface extending in the radial direction) as viewed from the axial direction.

FIGS. 5 to 9 are diagrams illustrating how the permanent magnet 415 and the fixing member 440 are disposed in the magnet insertion hole 410. FIG. 5 illustrates a partial cross-section of the rotor core 405 before a permanent magnet 415 is inserted into the magnet insertion hole 410, FIGS. 6 and 7 each illustrate a partial cross-section of the rotor core 405 in a state where the permanent magnet 415 is inserted in the magnet insertion hole 410, FIG. 8 illustrates a view in which a fixing member 440 is attached to a radial side surface (side surface extending in the circumferential direction) of a permanent magnet 415 as viewed from the axial direction, and FIG. 9 illustrates a view in which a fixing member 440 is attached to the circumferential side surface (side surface extending in the radial direction) of a permanent magnet 415 as viewed from the axial direction.

The fixing member 440 is a member that is formed substantially in an L-shape and is disposed to fill gaps between the permanent magnet 415 and the rotor core 405 and between the permanent magnet 415 and the end plate 420. Specifically, the fixing member 440 is configured with a first fixing portion 440A of a thin plate member disposed between the permanent magnet 415 and the rotor core 405 and with a second fixing portion 440B of a thin plate member disposed between the permanent magnet 415 and the end plate 420, and the first fixing portion 440A and the second fixing portion 440B are connected to each other substantially in an L-shape at an acute angle (specifically, an angle smaller than 90°). The fixing member 440 may be configured of any of a non-magnetic material, a magnetic material, and a synthetic resin. In addition, as illustrated in FIGS. 8 and 9, a length of a side surface of the fixing member 440 in contact with the permanent magnet 415 (a width L3 of the first fixing portion 440A) is preferably made smaller than a width M1 of the side surface of the permanent magnet 415 which is one of the following two side surfaces: the side surface in the axial direction (the side surface extending in the circumferential direction); and the side surface on the circumferential direction (the side surface extending in the axial direction) and on which the fixing member 440 is disposed (in other words, which is the side surface of the permanent magnet 415 in the radial direction in FIG. 8 and the side surface of the permanent magnet 415 in the circumferential direction in FIG. 9), so that the fixing member 440 does not protrude from the width of the permanent magnet 415 and there is therefore a margin at the time of insertion of the fixing member 440 and the permanent magnet 415 into the magnet insertion hole 410, whereby workability is improved.

The permanent magnet 415 is inserted into the magnet insertion hole 410 as illustrated in FIG. 6, with the fixing member 440 being disposed such that the first fixing portion 440A extends along the side surface of the permanent magnet 415 and the second fixing portion 440B is in contact with a bottom surface (surface on the insertion side in the axial direction) of the permanent magnet 415 as illustrated in FIG. 5. The length L1 of the first fixing portion 440A is preferably longer than the length L2 of the second fixing portion 440B.

In addition, as illustrated in FIG. 7, after the fixing member 440 is inserted to a position at which the fixing member is in contact with the end plate 420, the fixing member 440 is further pushed, so that the L-shaped angle is widened to generate a repulsive force. As a result, there are generated the following two forces: a force by which the first fixing portion 440A presses the permanent magnet 415 against the inner wall of the magnet insertion hole 410; and a force by which the second fixing portion 440B presses the permanent magnet 415 in the axial direction, so that the permanent magnet 415 is fixed at a predetermined position in the magnet insertion hole 410 by the interaction of the two forces.

In this case, as illustrated in FIGS. 8 and 9, a thickness T1 of the fixing member 440 is preferably set to be smaller than a value obtained by subtracting a size M2 from a size L4 so that there is a margin at the time of the insertion of the permanent magnet 415 to which the fixing member 440 is attached into the magnet insertion hole 410, whereby workability is therefore improved. The above size M2 is a size of the permanent magnet 415 on the side which is in either the radial direction or the circumferential direction and on which fixing member 440 is not disposed (a side surface of the permanent magnet 415 in the circumferential direction in FIG. 8, or a side surface of the permanent magnet 415 in the radial direction in FIG. 9). The above size L4 is a size of the magnet insertion hole 410 on the side which is in either the radial direction or the circumferential direction and on which the fixing member 440 is not disposed.

As illustrated in FIG. 8, of the side surfaces of the permanent magnet 415, the fixing member 440 may be disposed on the side surface in the radial direction. As illustrated in FIG. 9, of the side surfaces of the permanent magnet 415, the permanent magnet 415 may be disposed on the side surface in the circumferential direction. Regardless of which surface the fixing member 440 is disposed on, the fixing member 440 is further pushed in from the position where the fixing member 440 is in contact with the end plate 420, so that the L-shape is widened, and a force for holding the permanent magnet 415 in the axial direction is generated by friction between the permanent magnet 415 and the rotor core 405 (the inner wall of the magnet insertion hole 410), whereby the permanent magnet 415 is fixed at a predetermined position in the magnet insertion hole 410.

Figure 10:
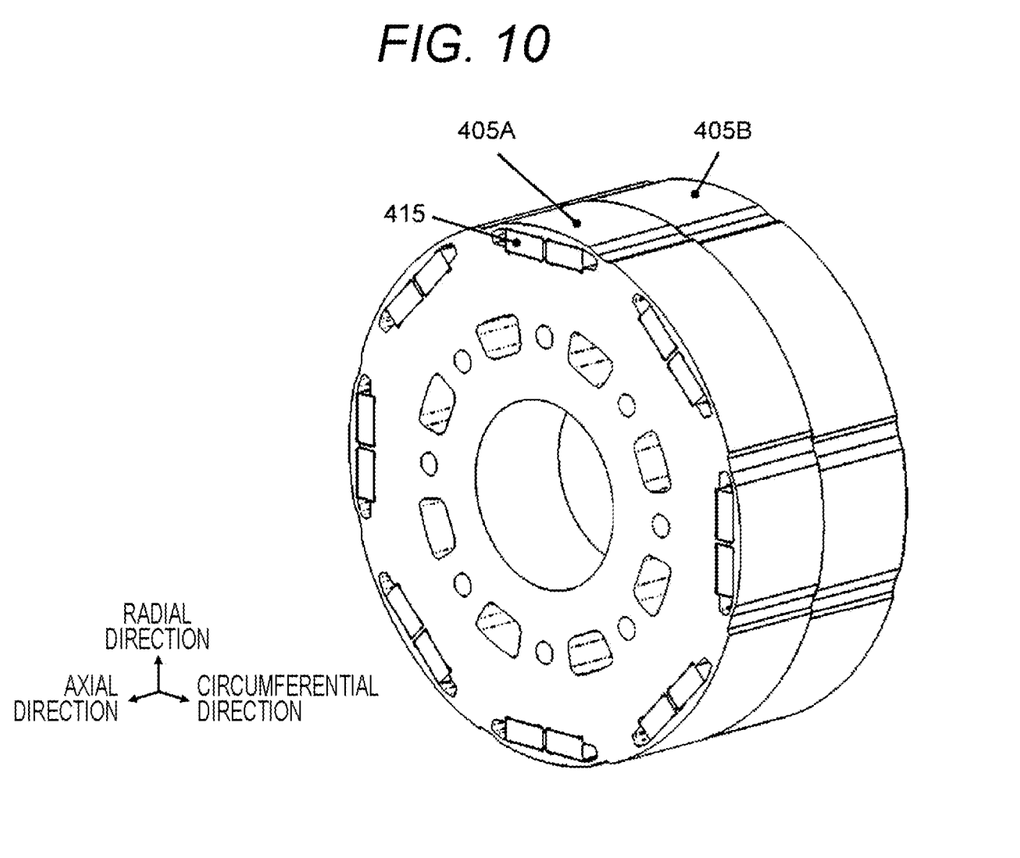
FIG. 10 is a perspective view of a stator core configured with two core pieces.

FIGS. 10 to 14 are diagrams each illustrating an example in which the rotor core 405 is configured with a plurality of core pieces. FIG. 10 is a perspective view of the rotor core 405 configured with two core pieces, FIGS. 11 and 12 each illustrate a partial cross-section of the rotor core 405 configured with two core pieces, and FIGS. 13 and 14 each illustrate a partial cross-section of the rotor core 405 configured with three core pieces.

The rotor core 405 may be configured with one core piece as illustrated in FIG. 4, or may be configured with two core pieces 405A and 405B as illustrated in FIG. 10. By configuring the rotor core 405 with a plurality of core pieces, it is possible to reduce an iron loss due to an eddy current generated in the magnet. As illustrated in FIG. 10, the plurality of core pieces may be disposed at shifted positions.

Figure 11:
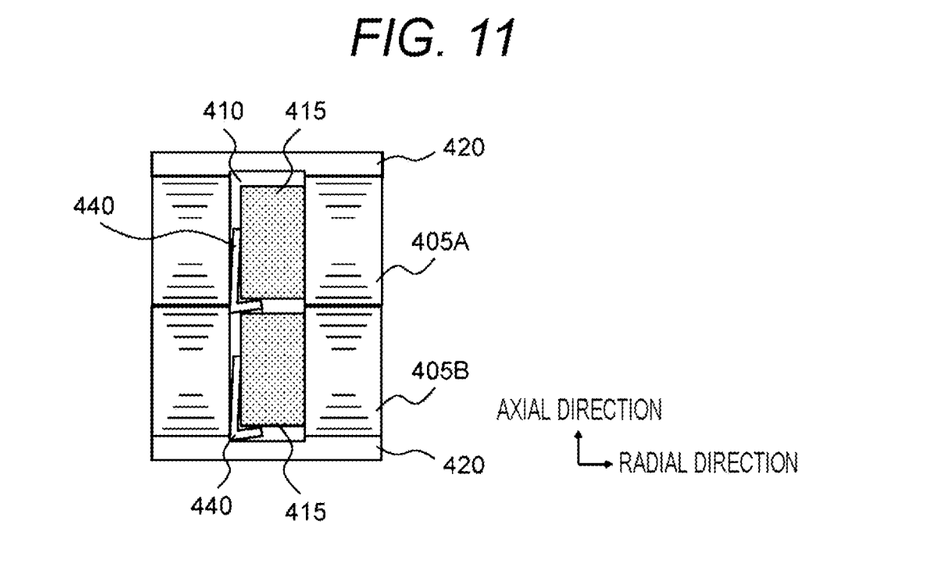
FIG. 11 is a partial cross-sectional view of a stator core configured with two core pieces.
Figure 12:
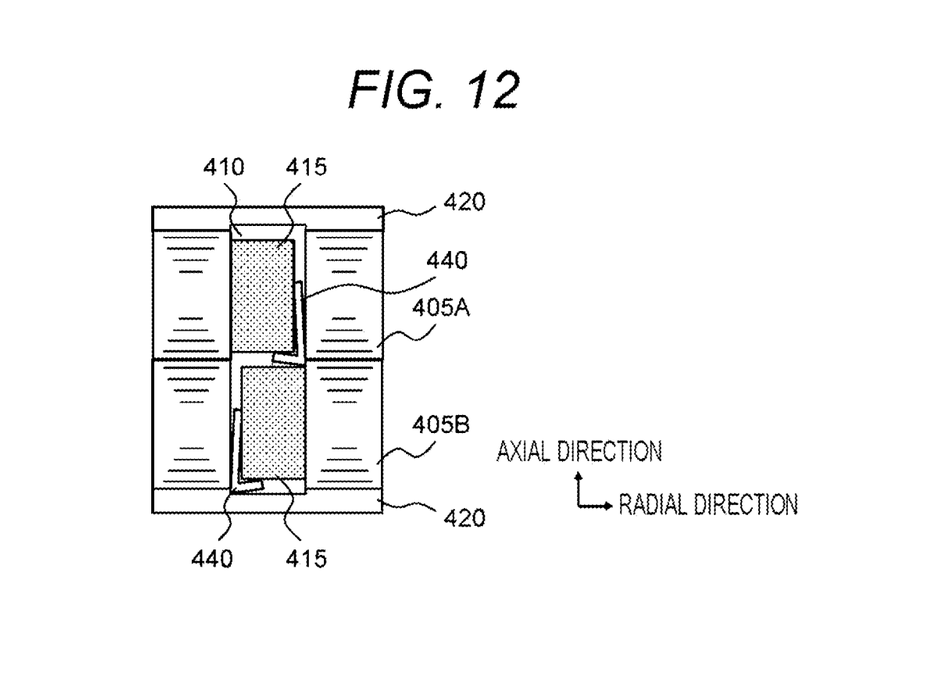
FIG. 12 is a partial cross-sectional view of a stator core configured with two core pieces.

When the rotor core 405 is configured with two core pieces, as illustrated in FIG. 11, the permanent magnets 415 are attached to the magnet insertion hole 410 of the rotor core 405, one for each of the core pieces 405A and 405B. The permanent magnets 415 are fixed to the rotor core 405 such that fixing members 440 are each disposed along one of the permanent magnets 415. Alternatively, as illustrated in FIG. 12, the fixing members 440 may be disposed alternately along the opposite side surfaces of the permanent magnets 415.

In addition to the illustrated forms, the fixing members 440 may be disposed alternately on the surfaces in the circumferential direction of the permanent magnets 415. With this arrangement, the permanent magnets 415 are arranged to be shifted to each other in the circumferential direction; therefore, it is possible to reduce the torque ripple in the same manner as the skew.

Alternatively, the fixing members 440 may be disposed alternatively on the surfaces in the circumferential direction and the surfaces in the radial direction of the permanent magnets 415. With this arrangement, the permanent magnets 415 are arranged to be shifted; therefore, it is possible to reduce the cogging.

Figure 13:
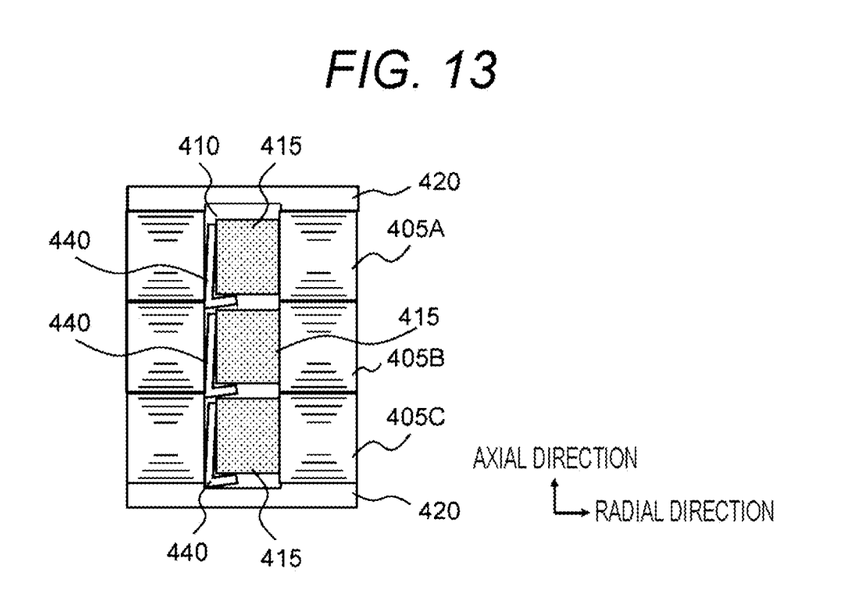
FIG. 13 is a partial cross-sectional view of a stator core configured with three core pieces.
Figure 14:
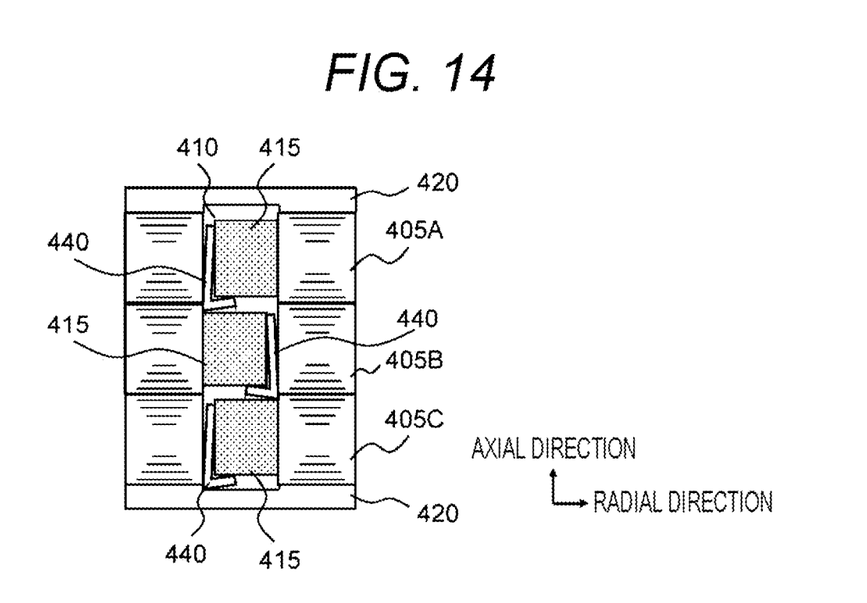
FIG. 14 is a partial cross-sectional view of a stator core configured with three core pieces.

Further, the rotor core 405 may be configured with three core pieces. In this case, as illustrated in FIG. 13, in the magnet insertion hole 410 of the rotor core 405, the permanent magnet 415 is attached to each core piece. The permanent magnets 415 are fixed to the rotor core 405 such that fixing members 440 are each disposed along one of the permanent magnets 415. further, as illustrated in FIG. 14, the fixing members 440 may be disposed alternately along different surfaces of the permanent magnets 415.

As described above, according to an embodiment of the present invention, a rotor 400 of a rotary electric machine is characterized in that the rotary shaft includes: a rotary shaft (shaft 430); at least one magnet (permanent magnet 415); a rotor core 405 having at least one magnet housing (magnet insertion hole 410) inside which the at least one magnet 415 is attached; and at least one fixing member 440 disposed inside the at least one magnet housing 410 to fix the at least one magnet 415, wherein the at least one fixing member 440 includes: a first fixing portion 440A that is in contact with a side surface of the at least one magnet 415 in a radial direction of the rotary shaft or in contact with a side surface of the at least one magnet 415 in a circumferential direction of the rotary shaft; and a second fixing portion 440B that is in contact with an end face of the at least one magnet 415 in an axial direction of the rotary shaft. The first fixing portion 440A and the second fixing portion 440B are connected to each other at an angle smaller than 90 degrees, and the at least one fixing member 440 is inserted, together with the at least one magnet 415, in the at least one magnet housing 410 and presses the at least one magnet 415 against an inner wall of the at least one magnet housing 410 due to an increase in the angle between the first fixing portion 440A and the second fixing portion 440B, so that it is possible to firmly fix the at least one magnet 415 to a predetermined position inside the magnet insertion hole 410 without sacrificing the ease of assembly. In addition, there is no leakage or protrusion unlike a liquid adhesive, and it is therefore easy to manage the manufacturing process. In addition, since the bent part of the fixing member 440 (the part connecting the first fixing portion 440A and the second fixing portion 440B) has an acute angle, the bent part functions as a guide when the magnet 415 is attached to the rotor core 405, whereby the ease of assembly can be improved.

In addition, since the length L1 of the first fixing portion 440A is equal to or longer than the length L2 of the second fixing portion 440B, the fixing member 440 can appropriately press the magnet 415.

In the case where the fixing member 440 is in contact with the side surface of the magnet 415 in the radial direction, the width L3 of the first fixing portion 440A in the circumferential direction is equal to or less than the length M1 of the magnet 415 in the circumferential direction, as shown in FIG. 9. In the case where the fixing member 440 is in contact with the side surface of the magnet 415 in the circumferential direction, the width L3 of the first fixing portion 440A in the radial direction is equal to or less than the length M1 of the magnet 415 in the radial direction as shown in FIG. 8. Therefore, the fixing member 440 does not protrude from the magnet 415 in the width direction, and the ease of assembly can be improved.

In the case where the fixing member 440 is in contact with the side surface of the magnet 415 in the radial direction, the thickness T1 of the first fixing portion 440A is smaller than the value obtained by subtracting the length M2 of the magnet 415 in the circumferential direction from the length L4 of the magnet housing 410 in the circumferential direction, as shown in FIG. 9. In the case where the fixing member 440 is in contact with the side surface of the magnet 415 in the circumferential direction, the thickness T1 of the first fixing portion 440A is smaller than the value obtained by subtracting the length M2 of the magnet 415 in the radial direction from the length L4 of the magnet housing 410 in the radial direction, as shown in FIG. 8. Therefore, the magnet 415 and the fixing member 440 can be easily inserted into the magnet insertion hole 410, and the ease of assembly can be improved.

The fixing member 440 is formed of any of a non-magnetic material, a magnetic material, and a resin material. When a non-magnetic material is used to form the fixing member 440, it is possible to use a material such as stainless steel having high corrosion resistance without disturbing the magnetic force by the magnet 415. Further, when a magnetic material is used to form the fixing member 440, the fixing member 440 can act integrally with the magnet 415. Alternatively, when the fixing member 440 is formed of a resin material, it is possible to reduce the weight and cost. In addition, because the fixing member 440 has an insulation property, an eddy current can be reduced.

In addition, a plurality of magnets 415 are attached inside one magnet housing 410, and the fixing members 440 are each arranged in a pair with one of the single magnets 415 so as to fix each of the plurality of magnets attached inside the magnet housing 410, so that the plurality of magnets 415 can be each firmly fixed at a predetermined position inside the magnet insertion hole 410.

In addition, the rotor core 405 is configured with a plurality of core pieces 405A and 405B forming the magnet housing 410, and the plurality of core pieces 405A and 405B are stacked to constitute the rotor core 405 such that attachment positions of the magnets 415 are shifted in the circumferential direction, so that the magnets 415 provided for each core piece can be firmly fixed at predetermined positions inside the magnet insertion hole 410.

In addition, regarding the plurality of magnets 415 attached to one magnet housing 410, the fixing members 440 are disposed at such positions that the fixing members 440 are in contact with the surfaces, of the magnets 415, in different directions, so that the magnets 415 are arranged in the rotor core 405 to be shifted from the center of the magnet insertion hole 410, whereby a torque ripple can be reduced.

Further, regarding the magnets 415 adjacently attached to one magnet housing, the fixing members 440 are disposed at such positions that the fixing members 440 are in contact with the opposite side surfaces of the magnets 415, so that the magnets 415 are arranged in the rotor core 405 to be shifted from the center of the magnet insertion hole 410, whereby a torque ripple can be reduced.

Note that the present invention is not limited to the above-described embodiments, and includes various variations and equivalent configurations within the spirit of the appended claims. For example, the above-described embodiments have been described in detail for easy understanding of the present invention, and the present invention is not necessarily limited to an embodiment including all the described configurations. Further, a part of the configuration of one embodiment may be replaced with a configuration of another embodiment. In addition, a configuration of another embodiment may be added to the configuration of one embodiment. In addition, another configuration may be added to, removed from, or substituted for a part of the configuration of each embodiment.

REFERENCE SIGNS LIST 100 vehicle
110 front wheel
120 engine
130 transmission
140 differential gear
150 battery
160 power convertor
200, 201 rotary electric machine
205 housing
210 end bracket
300 stator
305 stator core
306 yoke core
307 Teeth core
310 slot
400 rotor
405 rotor core
405A, 405B core piece
410 magnet insertion hole
415, 415a, 415b permanent magnet
420 end plate
425, 426 bearing
430 shaft
440 fixing member
440A first fixing portion
440B second fixing portion
500 air gap

The invention claimed is:

1. A rotor for a rotary electric machine comprising:
a rotary shaft;
at least one magnet;
a rotor core having at least one magnet housing inside which the at least one magnet is attached; and
at least one fixing member disposed inside the at least one magnet housing to fix the at least one magnet, wherein the at least one fixing member includes:
a first fixing portion that is in contact with a side surface of the at least one magnet in a radial direction of the rotary shaft or in contact with a side surface of the at least one magnet in a circumferential direction of the rotary shaft; and
a second fixing portion that is in contact with an end face of the at least one magnet in an axial direction of the rotary shaft,
wherein the first fixing portion and the second fixing portion are connected to each other at an angle smaller than 90 degrees,
wherein the at least one fixing member is inserted, together with the at least one magnet, in the at least one magnet housing and presses the at least one magnet against an inner wall of the at least one magnet housing due to an increase in the angle between the first fixing portion and the second fixing portion,
wherein when the fixing member is in contact with the side surface of the at least one magnet in the radial direction, a width of the first fixing portion in the circumferential direction is equal to or less than a width of the at least one magnet in the circumferential direction, and
wherein when the fixing member is in contact with the side surface of the at least one magnet in the circumferential direction, a width of the first fixing portion in the radial direction is equal to or less than a width of the at least one magnet in the radial direction.

2. The rotor for a rotary electric machine according to claim 1, wherein a length of the first fixing portion is equal to or longer than a length of the second fixing portion.

3. The rotor for a rotary electric machine according to claim 1, wherein when the fixing member is in contact with the side surface of the at least one magnet in the radial direction, a thickness of the first fixing portion is smaller than a value obtained by subtracting a length of the at least one magnet in the circumferential direction from a length of the at least one magnet housing in the circumference direction, and
when the fixing member is in contact with the side surface of the at least one magnet in the circumferential direction, the thickness of the first fixing portion is smaller than a value obtained by subtracting a length of the at least one magnet in the radial direction from a length of the at least one magnet housing in the radial direction.

4. The rotor for a rotary electric machine according to claim 1, wherein the fixing member is formed of any one of a non-magnetic material, a magnetic material, and a resin material.

5. The rotor for a rotary electric machine according to claim 1, wherein the at least one magnet includes a plurality of magnets,
the at least one fixing member includes a plurality of fixing members,
the plurality of magnets are attached inside a single of the at least one magnet housing, and
the plurality of fixing members are disposed in one-to-one correspondence with the plurality of magnets attached inside the at least one magnet housing to fix the plurality of magnets in one-to-one correspondence manner.

6. The rotor for a rotary electric machine according to claim 5, wherein the rotor core is configured with a plurality of core pieces forming the at least magnet housing, and
the plurality of core pieces are stacked to constitute the rotor core and to make attachment positions of the plurality of magnets be shifted in the circumferential direction.

7. The rotor for a rotary electric machine according to claim 5, wherein the plurality of fixing members are disposed at positions at which the plurality of fixing members are in contact with surfaces, of the plurality of magnets attached to the single of the at least one magnet housing, facing different directions.

8. The rotor for a rotary electric machine according to claim 7, wherein the plurality of fixing members are disposed at positions at which the plurality of fixing members are in contact with opposite side surfaces of the plurality of magnets adjacently attached to the single of the at least one magnet housing.

9. A rotary electric machine comprising the rotor according to claim 1.

10. A rotor for a rotary electric machine comprising:
a rotary shaft;
at least one magnet;
a rotor core having at least one magnet housing inside which the at least one magnet is attached; and
at least one fixing member disposed inside the at least one magnet housing to fix the at least one magnet, wherein the at least one fixing member includes:
a first fixing portion that is in contact with a side surface of the at least one magnet in a radial direction of the rotary shaft or in contact with a side surface of the at least one magnet in a circumferential direction of the rotary shaft; and
a second fixing portion that is in contact with an end face of the at least one magnet in an axial direction of the rotary shaft,
wherein the first fixing portion and the second fixing portion are connected to each other at an angle smaller than 90 degrees,
wherein the at least one fixing member is inserted, together with the at least one magnet, in the at least one magnet housing and presses the at least one magnet against an inner wall of the at least one magnet housing due to an increase in the angle between the first fixing portion and the second fixing portion,
wherein when the fixing member is in contact with the side surface of the at least one magnet in the radial direction, a thickness of the first fixing portion is smaller than a value obtained by subtracting a length of the at least one magnet in the circumferential direction from a length of the at least one magnet housing in the circumference direction, and
wherein when the fixing member is in contact with the side surface of the at least one magnet in the circumferential direction, the thickness of the first fixing portion is smaller than a value obtained by subtracting a length of the at least one magnet in the radial direction from a length of the at least one magnet housing in the radial direction.

11. The rotor for a rotary electric machine according to claim 10, wherein a length of the first fixing portion is equal to or longer than a length of the second fixing portion.

12. The rotor for a rotary electric machine according to claim 10, wherein when the fixing member is in contact with the side surface of the at least one magnet in the radial direction, a width of the first fixing portion in the circumferential direction is equal to or less than a width of the at least one magnet in the circumferential direction, and
when the fixing member is in contact with the side surface of the at least one magnet in the circumferential direction, a width of the first fixing portion in the radial direction is equal to or less than a width of the at least one magnet in the radial direction.

13. The rotor for a rotary electric machine according to claim 10, wherein the fixing member is formed of any one of a non-magnetic material, a magnetic material, and a resin material.

14. The rotor for a rotary electric machine according to claim 10, wherein the at least one magnet includes a plurality of magnets,
the at least one fixing member includes a plurality of fixing members,
the plurality of magnets are attached inside a single of the at least one magnet housing, and
the plurality of fixing members are disposed in one-to-one correspondence with the plurality of magnets attached inside the at least one magnet housing to fix the plurality of magnets in one-to-one correspondence manner.

15. The rotor for a rotary electric machine according to claim 14, wherein the rotor core is configured with a plurality of core pieces forming the at least magnet housing, and
the plurality of core pieces are stacked to constitute the rotor core and to make attachment positions of the plurality of magnets be shifted in the circumferential direction.

16. The rotor for a rotary electric machine according to claim 14, wherein the plurality of fixing members are disposed at positions at which the plurality of fixing members are in contact with surfaces, of the plurality of magnets attached to the single of the at least one magnet housing, facing different directions.

17. The rotor for a rotary electric machine according to claim 16, wherein the plurality of fixing members are disposed at positions at which the plurality of fixing members are in contact with opposite side surfaces of the plurality of magnets adjacently attached to the single of the at least one magnet housing.

18. A rotary electric machine comprising the rotor according to claim 10.

* * * * *